United States Patent [19]

Arnold

[11] 4,333,384
[45] Jun. 8, 1982

[54] ROTARY RACK LAUNCHER WITH DIRECT LOAD PATH SUSPENSION

[75] Inventor: Alison M. Arnold, Greenbank, Wash.

[73] Assignee: The Boeing Company, Seattle, Wash.

[21] Appl. No.: 159,372

[22] Filed: Jun. 13, 1980

[51] Int. Cl.$^3$ ............................................. F41F 3/06
[52] U.S. Cl. .................................. 89/1.803; 89/1.804; 89/1.815; 244/137 R
[58] Field of Search ............... 89/1.801, 1.802, 1.803, 89/1.804, 1.805, 1.815, 1.8, 33 BC, 33 D; 244/137 R

[56] References Cited

U.S. PATENT DOCUMENTS

| | | | |
|---|---|---|---|
| 2,278,949 | 4/1942 | Sabini | 89/1.5 H X |
| 2,440,723 | 5/1948 | MacDonald | 89/1.804 |
| 2,587,672 | 3/1952 | Whitson | 89/1.804 |
| 2,599,555 | 6/1952 | Hurt | 89/1.803 |
| 2,646,786 | 7/1953 | Robertson | 89/1.5 R X |
| 2,800,056 | 7/1957 | Atherton | 89/1.803 |
| 2,826,120 | 3/1958 | Lang et al. | 89/1.803 |
| 2,900,874 | 8/1959 | Tjossem | 89/1.815 |
| 2,975,676 | 3/1961 | Butler | 89/1.803 |
| 3,186,303 | 6/1965 | Linke et al. | 89/1.803 |
| 3,249,011 | 5/1966 | Wermager et al. | 89/45 X |
| 3,526,166 | 9/1970 | Pfister | 89/1.805 X |
| 3,999,460 | 12/1976 | Skliris | 89/1.803 |
| 4,040,334 | 8/1977 | Smethers | 89/1.804 |
| 4,128,039 | 12/1978 | Skliris | 89/1.803 |
| 4,208,949 | 6/1980 | Boilsen | 89/1.815 X |

*Primary Examiner*—David H. Brown
*Attorney, Agent, or Firm*—Delbert J. Barnard; Eugene O. Heberer; Joan H. Pauly

[57] ABSTRACT

A rotary rack launcher for use in an aircraft for carrying missiles or other droppable or ejectable stores, the launcher being formed of a rimless wheel having a hub and spokes. The spokes are supported by shoes on their outer ends in a circular or near circular, including elliptical, track or tracks that are mounted in the aircraft. The track or tracks have cutaway portions through which the stored material is dropped or ejected. The missiles or other material are supported from the hub between adjacent spokes by a conventional bomb rack or ejection device, attached to the missile, for example, near its center of gravity. The launcher structure provides for the load path for support to be directly from the ejector device, through the hub, to the spokes, to the track or tracks, and to the airframe.

14 Claims, 8 Drawing Figures

FIG. 4
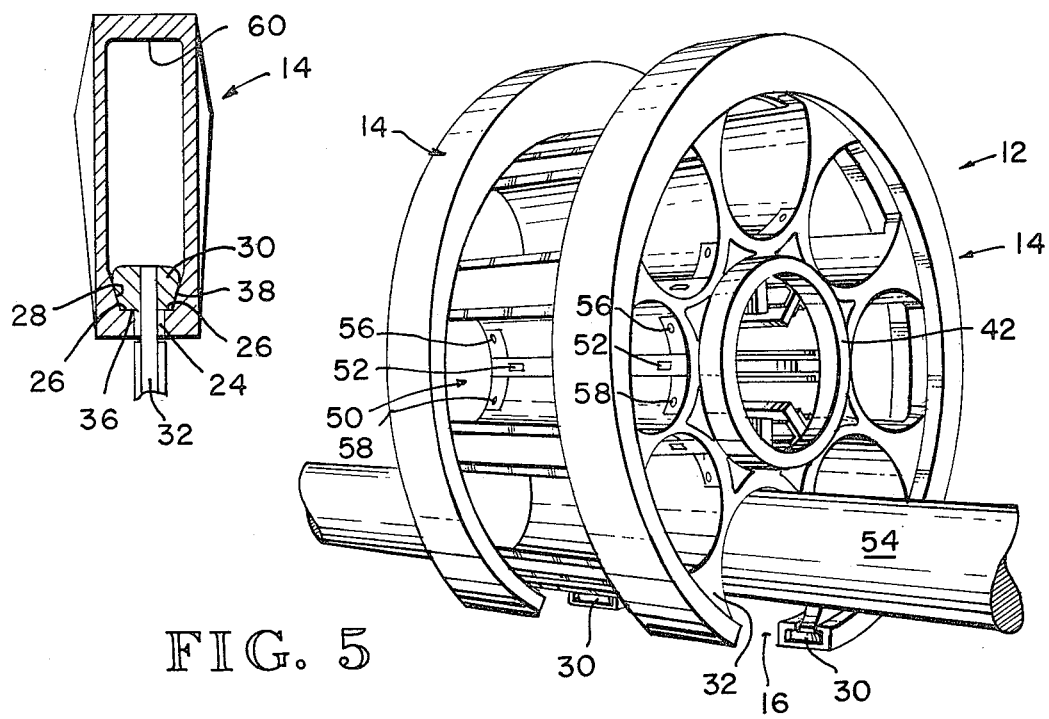
FIG. 5
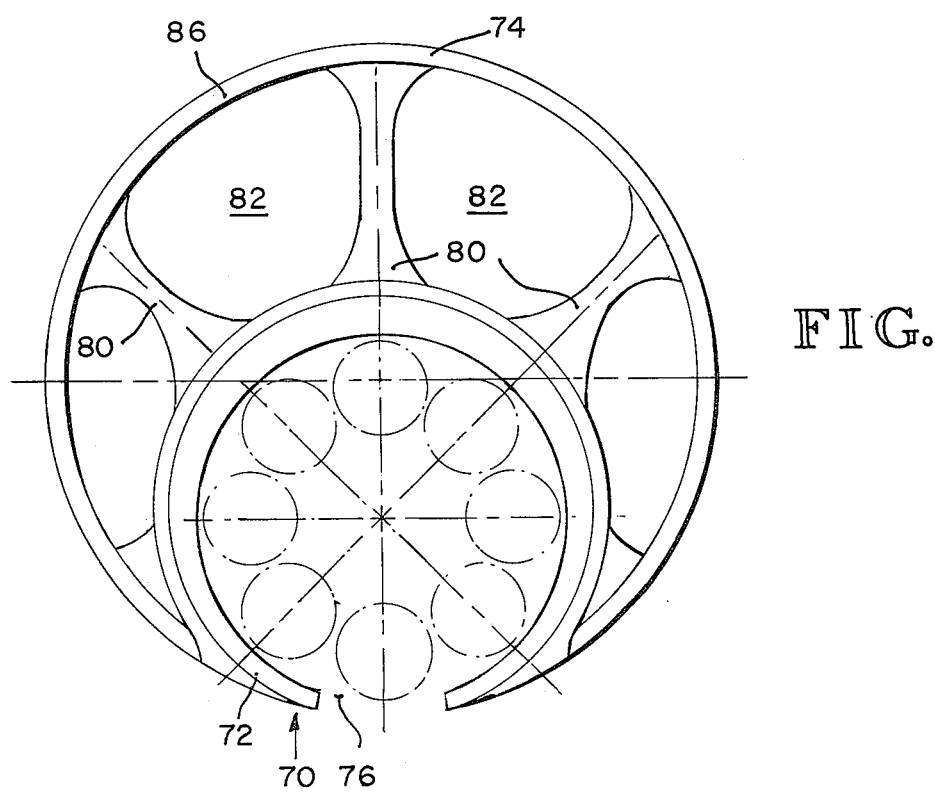
FIG. 6

ROTARY RACK LAUNCHER WITH DIRECT LOAD PATH SUSPENSION

BACKGROUND OF THE INVENTION

The current production rotary rack as used in the B-52 aircraft and as designed for the B-1 aircraft has a twenty foot long tube for the centerbody to which missiles are attached by ejector racks. The load path for support is from the ejector rack through the twenty foot long tube, to a bearing support structure at each end of the tube, and then to the airframe. This arrangement requires the twenty foot long tube to be structurally adequate so as to withstand the bending loads imposed upon it by the missiles under airplane ground and flight load conditions. For an aggregate missile load of about twenty thousand pounds under a 4.5 g load factor, a large bending moment is developed and requires a steel tube of about 16 inches in diameter and having a wall thickness of about ¾ to 1 inch. This type of structure presents the problem of excess weight and excess space requirements.

SUMMARY OF THE INVENTION

According to the invention, a rotary rack launcher, for carrying missiles and other materials to be dropped or ejected from aircraft, is provided and in which the material carried is supported in a direct load path suspension. The rotary rack is in the form of a rimless wheel having a hub and spokes, and the outer ends of the spokes are supported from a circular or near circular track mounted in the airframe. The rack has a cutaway segment through which the missile or other material is dropped or ejected. The missiles are supported around the hub between adjacent spokes by means of a conventional bomb rack such as the MAU. This arrangement provides for a direct load path from the ejector rack, through the hub, to the spokes, to the circular track, and to the airframe to which the track is connected. One or more tracks may be used.

In the structure according to the invention, the sixteen inch steel tube of the prior art is not necessary because the load path is directly to the airframe through the circular tracks. Deletion of the steel tube of the prior art and replacing its function with the invention rack reduces the rack structural weight to approximately 75% below that of the prior art twenty foot steel tube arrangement.

Accordingly, it is an object of the invention to provide an improved rotary rack missile launcher in which the structural weight is reduced so as to be approximately one quarter of that required in the prior art.

It is another object of the present invention to provide a rotary rack launcher which permits easy crew access for ejector arming, inspection, and adjusting. For example, when used in a 707 model jet aircraft there is space to provide a three foot diameter centrally positioned opening in the center of the hub of the invention. Where the umbilical services are fed in from one end in such an installation, the opposite end provides access thereto. The clearance through the hub itself is available through about a two foot diameter hole.

It is still another object of the present invention to provide a rotary rack launcher which greatly reduces the space requirements for the launcher in contrast to that in the prior art.

It is a further object of the present invention to provide a rotary rack launcher wherein a unitized installation of a completely loaded rack is bolted to the airframe at discrete points.

It is still further object of the invention to provide a hub and spoke supporting arrangement in which the spokes may be limited in strength and size for tension loading only so as to provide a minimum space between the material or missiles carried or in which the spokes may also be made to accept both tension and compression loading where more space is available between the missiles being carried.

It is another object of the invention to provide circular or approximately circular tracks for providing the support between the rimless wheel and the airframe. The circular tracks have the form of a "C" as a result of the cutaway segment which is required as an aperture through which the missile is ejected or dropped. Because of the nature of the C-track, it can be easily strengthened within the airframe in its connection to the frame, stringers and skin of the aircraft. Further bulkheads or shear panels can be connected directly to the periphery of the C-track to provide load paths for strengthening the track and to provide means by which the loads from the track can be introduced into the airplane directly from the rack and the payload it supports.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

FIG. 4 is a fragmentary cross-sectional view taken along the lines 4—4 in FIG. 2;

FIG. 5 is a perspective view illustrating the details of a two track launcher similar to that shown in FIG. 1;

FIG. 6 is an end of view of a fuselage or pod center line installation of the invention;

DESCRIPTION OF THE PREFERRED EMBODIMENTS

Figure 1:
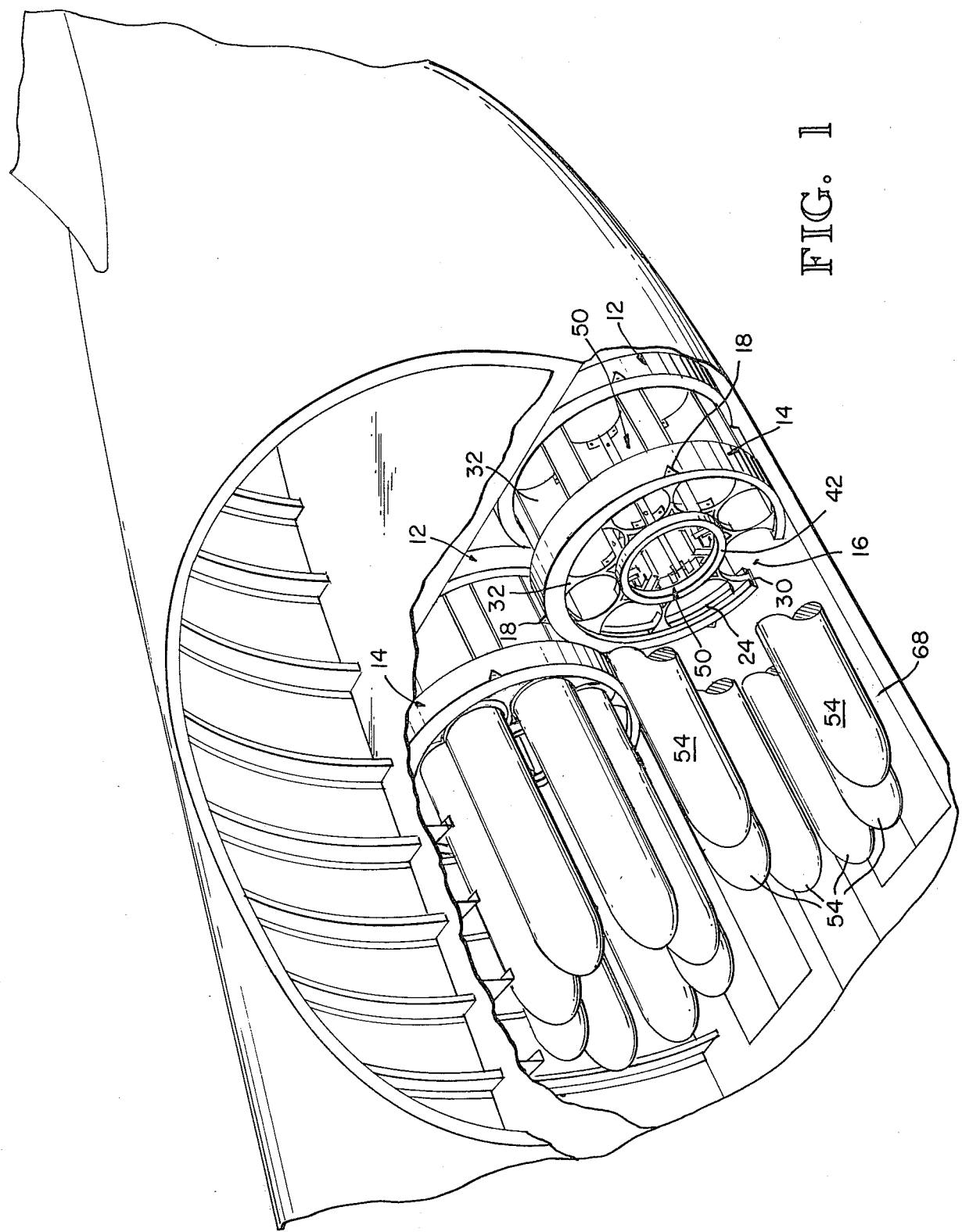
FIG. 1 is a perspective view of a double launcher arrangement for use with cruise missiles in a 707 model jet airplane.
Figure 2:
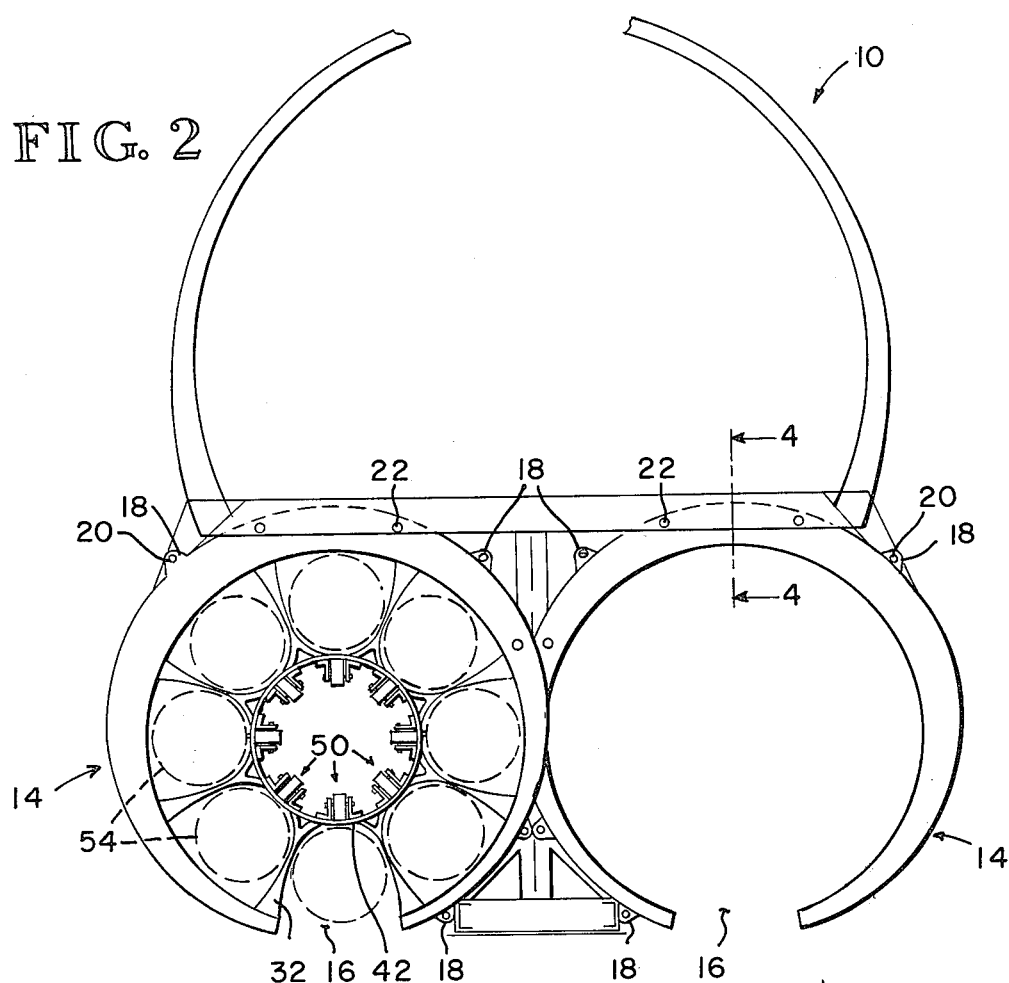
FIG. 2 is a fragmentary end view of the launcher substantially as shown in FIG. 1.

Referring again to the drawings, there is shown in FIGS. 1 and 2 fragmentary views of the fuselage of a 707 model jet airplane, generally designated as 10, and having in the lower part thereof two C-shaped, overlapping, rotary rack missile launchers, generally designated as 12. Each launcher is formed of two axially aligned generally circular tracks 14, having cutaway segments 16 at their lower ends to permit the ejection of the missile or other type of payload therefrom. The cutaway 16 gives the track the configuration of a figure "C" when viewed in front elevation. A plane perpendicular to the hub axis extends through the shoes and track. Externally of the tracks are tabs as 18 by which the tracks may be quickly attached to the airframe by means of bolts as at 20. Additional bolts may extend from but not through the track at convenient locations such as 22.

As shown in FIG. 4 the tracks 14 are also C-shaped in cross section. In cross section the tracks are generally rectangular, having an inner peripheral slot 24 which forms the C-opening, therebeing inner annular shoulders 26 on both sides of the slot forming a portion of the C-configuration. Generally radially outwardly of the surfaces 26 are wedge support surfaces 28.

Secured within the track are truncated wedge-shaped shoes 30 on the outer ends of spokes 32. Inner surfaces 36 of the shoes move in rotation relative to the track surfaces 26 and shoe wedge surfaces 38 simlarly move in rotation with respect to track wedge support surfaces 28.

The spokes extend radially inwardly from the shoes to the hub 42 to which they are secured. The shoes, spokes, and hub from a rimless wheel supported within the circular or approximately circular track 14. Adjacent spokes and shoes are spaced to stop on opposite sides of the opening 16. The means for positioning the missiles in register with the openings 16 are not shown.

Figure 3:
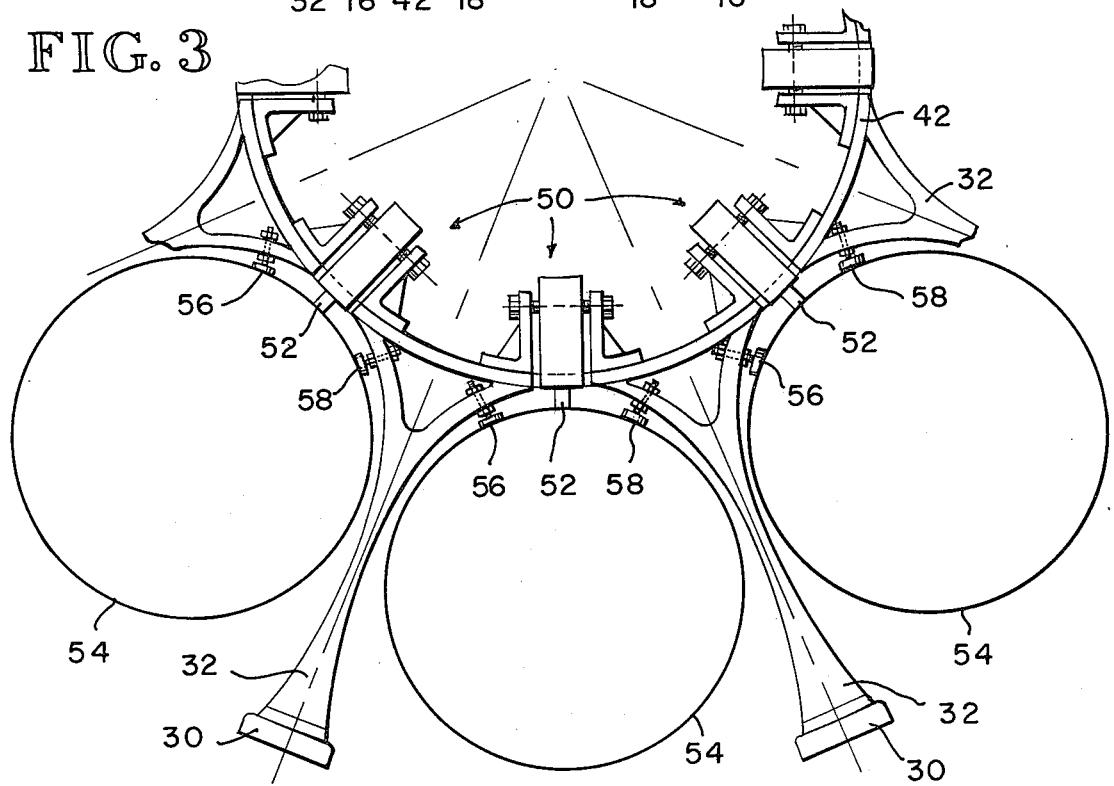
FIG. 3 is a fragmentary detailed end view of a hub, ejector racks, spokes, and shoes of a launcher in FIG. 2.

Between each pair of adjacent spokes at their inner ends, secured to the hub and extending therethrough are MAU ejector racks, generally designated as 50, FIG. 3. These racks are of a conventional type used to eject bombs or other payloads from aircraft and have a plunger 52, adapted to act upon a missile as 54. On both sides of the plunger are stabilizing pads 56 and 58, FIGS. 3 and 5. The conventional mechanisms for operating the ejector racks 50 are not shown but when they function, the plungers 52 move outwardly against the missiles and release of the rack hooks, not shown, allows the missiles to be ejected by the force of the plungers 52.

As best seen in FIGS. 1,4, and 5, the hub and spokes extend between the two tracks 14. The spokes 32 between the tracks are narrowed so as to be rotatable without contacting the track inner edges between and adjacent the slots 24.

The hub and track system, as shown are for a configuration utilizing tension loading of the hub spokes. This is particularly desirable in a situation where the space between the missiles must be small. For example in FIG. 2, the space between the circumferences of two adjacent missiles along a line between their centers is designated to be 1.2 inches.

In FIG. 4 there is shown a cross section of the track upper portion where the track is thicker vertically than at the lower portions. This additional thickness provides a space relief above the shoes so that they avoid contact with the internal outer circumferential surface 60 of the track. This is required where the spokes are made for tension loading only and are not strong enough to withstand compressive loads.

Because of the tension loading, a C-shaped track formed with a launch opening 16 at the lower end must be sized for bending loads opposite this opening. An alternate approach would be to use spokes capable of compression loading and obtain more airframe assistance in resisting loads. Such spokes could be used where more space between the missiles would be acceptable so as to permit sufficient cross section for the compression spokes.

The hub 42, the spokes 32, and the shoes 30 may be rotated with respect to the tracks 14 by drive means not shown. Because of umbilical attachments the hub rotation would not be greater than 360°. As shown in FIG. 1, the missiles are ejected through doors 68 in the bottom of the aircraft.

According to the invention, the missiles are supported from the hub of the rimless wheel or wheels by an MAU ejector rack attached to the missiles near their centers of gravity. The load path for support, thus, is directly from the ejector rack, through the hub, to the spokes, to the circular tracks and to the airframe to which the tracks are securely attached. The weight and space savings of the present system are clearly evident in comparison with the prior art 20 foot, 16 inch diameter steel tube on which the missiles are supported by the MAU ejector racks. The substantial opening through the hub 42 provides for a more than adequate access from one end when the umbilical services are fed from the other end.

In FIG. 6 a fragmentary elevational view of a launcher 70 according to the invention is shown. Here the hub, ejector racks, spokes and shoes are omitted and the missiles are shown in position in phantom outline. The track 72 is positioned with its center line in a centeral vertical plane through the aircraft fuselage 74. The track 72 has the same general configuration as that shown in FIG. 2, the launching cutaway 76 being at the central bottom of the aircraft. In this installation the track 72 is connected to the airframe by frames 80 and bulkhead or shear panels 82, the frames and the panels extending radially in a plane between the track 72 and the skin 86. Thus, the fuselage structure with the frames, skin and bulkhead or shear panels provide the load paths for strengthening the C-track beam and provide for loads introduction into the airplane from the ejector rack and the supported payload in the form of missiles.

Figure 7:
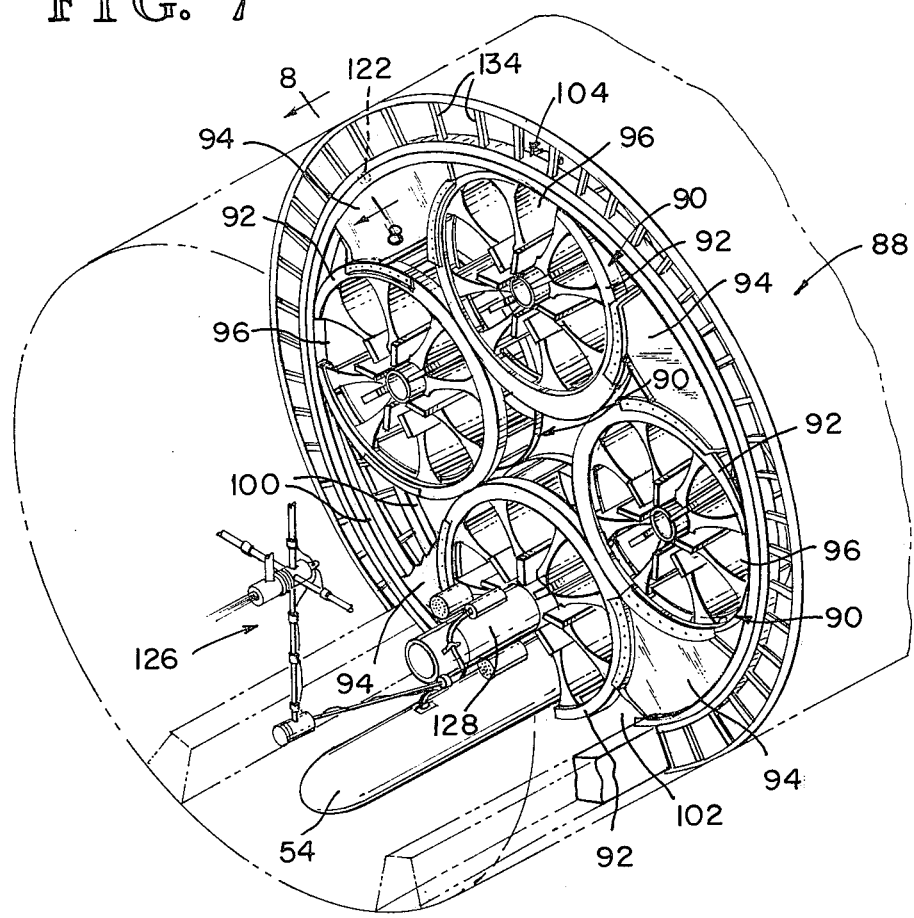
FIG. 7 is a fragmentary perspective view of a carrousel configuration of four launchers according to the invention.

In FIG. 7 a carrousel configuration of four launchers 90 is shown in an aircraft 88. The launchers have the same general configuration as those shown in FIG. 2 and each have their respective pairs of tracks 92 secured together by four frame members 94, only three shown. These tracks are arranged so that when a track is moved into a lower location for missile ejection, the opening 96 faces the bottom of the aircraft.

Figure 8:
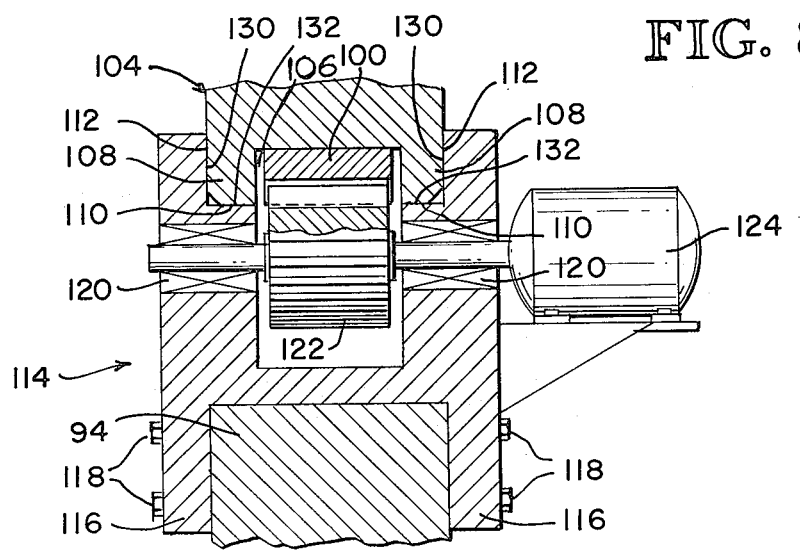
FIG. 8 is an enlarged fragmentary cross-sectional view taken along the line 8—8 of FIG. 7.

The eight tracks 92, two for each launcher, are secured together to rotate relative to two fixed partial internal ring gears 100. The ring gears are cutaway at their lower portions 102 to permit launching, and are secured in inwardly opening channels 106, FIG. 8, of aircraft annular frame members 104 which are coextensive with the ring gears. The channels 106 have legs 108 which form launcher-to-frame load paths through annular and radial bearing surfaces 110 and 112, respectively. The surfaces 110 and 112 may be coated with commercial solid lubricants or Teflon, for example.

Fitted on each of the outer ends of frame members 94 are drive-pinion carriers and load-path members 114, only one shown. Radially inner legs 116 of the members 114 are secured to members 94 by bolts 118.

Supported for rotation outwardly of members 94 in members 114 on bearings 120 are drive pinions 122, meshed with the ring gears 100, four for each ring gear, only one shown. Each pinion 122 is driven by a motor 124 supported on a respective member 114. The motors 124 are reversible and rotate the carrousel launchers less than 360°, the rotation being limited by umbilical cord connections, generally designated as 126. Only one of the umbilical attachments 128 is shown, extending into a hub of a launcher.

Launcher-to-frame load path radial and annular surfaces 130 and 132 on members 114 are snugly engaged for rotation on surfaces 112 and 110, respectively. Ribs 134 connect members 104 to the aircraft skin.

The carrousel arrangement permits direct connection from the four ejector racks to the skin of the aircraft 88 in a manner similar to that described with respect to FIG. 6. This arrangement permits four or more rotary launchers to be installed and rotated into position so that each rack can dispose of its load at its launching aperture 96 through the space 102 at the lower part of the aircraft. After a rack is emptied or partially emptied, the carrousel can be rotated to a new position to permit another rack to dispose of its load.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way an example. I do not wish to be restricted to the specific forms shown or uses mentioned except as defined in the accompanying claims.

What is claimed is:

1. A rotary rack launcher, comprising:
a rotatable hub,
spaced spokes extending radially outwardly from said hub,
shoes extending from the outer ends of said spokes,
a track extending generally peripherally around said spokes and said shoes,
said shoes being adapted to ride on and be secured to said track so that said hub, said spokes, and said shoes can be moved relative to said track and be supported thereby,
means attached to said track for securing said track to an aircraft so that said hub has its axis transverse to a plane through said shoes,
said track being cutaway peripherally so that a launch may be made from a lower portion thereof below said axis, said cutaway portion of said track being along the periphery sufficiently to extend between two adjacent spokes, and
means adjacent said hub and the inner ends of said spokes for supporting launchable material between each pair of consecutive spokes,
whereby the loadpath for material launchable through said cutaway supported between a pair of adjacent spokes is directly through said means adjacent said hub, through the hub, to the spokes, to the track, and to the aircraft.

2. The invention according to claim 1 in which:
said track is generally C-shaped in cross section, a C-opening between the ends of the C-shape being relatively narrow in the form of a slot and being open in the direction of the hub,
said spokes extending into the track through said C-opening,
said shoes in cross section being in the shape of a truncated wedge, narrowing inwardly toward the hub,
said track in cross section outwardly of said slot having wedge-shaped surfaces complementary to said shoes to receive and to support the shoes in the track.

3. The invention according to claim 1 in which:

said track is generally C-shaped in cross section, a C-opening between the ends of the C-shape being directed inwardly toward the hub,
said spokes extending into the track through said C-opening,
generally axially directed inner surfaces on both sides of said C-opening,
said shoes having generally axially directed surfaces for riding on said generally axially directed surfaces on both sides of said C-opening to support said spokes for rotation in said track.

4. The invention according to claim 3 in which:
said track has sufficient space generally outwardly of said C-opening and away from the hub to permit the shoes to move outwardly of the C-opening in the track without making contact with a resisting surface in the track.

5. The invention according to claim 1 in which:
said plane through said shoes extends through said track and is at least approximately perpendicular to said hub axis,
a plurality of said tracks in said plane and having hub axes that are substantially parallel,
each track is C-shaped within said plane, a C-opening being formed by the cutaway portion between the ends of the C-shape, said cutaway portion being adapted to be positioned in a lower portion of the track for launch purposes,
said means attached to said tracks for securing the tracks to an aircraft include an aircraft structure for strengthening the C-shaped tracks and for introducing loads into the aircraft from said means adjacent said hub and the inner ends of said spokes,
said hub and spokes of the track being rotatable so that each pair of consecutive spokes is positionable at a launch position by the rotation.

6. The invention according to claim 5 in which:
each track has a second track spaced therefrom and axially aligned therewith, and
one of said hubs extending between each respective pair of axially aligned tracks.

7. The invention according to claim 1 in which:
said plane through said shoes extends through said track and is at least approximately perpendicular to said hub axis,
said track is C-shaped within said plane, a C-opening being formed by the cutaway portion between the ends of the C-shape, said cutaway portion being at a lower portion of the track, an upper part of the track being opposite said cutaway portion,
said upper part of the track being structured to receive substantial bending loads.

8. The invention according to claim 7 in which:
said hub has a diameter sufficient to provide a working space therethrough.

9. The invention according to claim 7 in which:
said upper part of the track is generally circular.

10. The invention according to claim 1 in which:
said plane through said shoes extends through said track and is least approximately perpendicular to said hub axis,
said rack is C-shaped within said plane, a C-opening being formed by the cutaway portion between the ends of the C-shape, said cutaway portion being at a lower portion of said track, an upper part of the track being opposite side cutaway portion,
said means attached to said track for securing the track to an aircraft include aircraft structure for strengthening the C-shaped track and for introducing loads into the aircraft from said means adjacent said hub and the inner ends of said spokes.

11. The invention according to claim 10 in which:
said aircraft structure includes framework, and transverse sheer panels.

12. The invention according to claim 10 in which:
said aircraft structure includes frames, bulkheads and skin.

13. The invention according to claim 10 in which:
said axis of said hub is in a generally vertical plane adapted to extend substantially through the center of the aircraft,
said axis being in a generally horizontal plane adapted to extend through the lower half of the aircraft so that said C-opening is adapted to extend along the bottom of the aircraft,
said structure for strengthening the C-shaped track extending outwardly around the track as a part of the aircraft frame structure.

14. The invention according to claim 10 in which:
there are a plurality of said tracks spaced and axially aligned,
said hub extending between said tracks,
axially aligned spokes extending from said hub and having shoes on said spokes adapted to ride on respective tracks,
said axis of said hub being in a generally vertical plane adapted to extend substantially through the center of the aircraft,
said axis being in a generally horizontal plane adapted to extend through the lower half of the aircraft so that said C-opening is adapted to extend along the bottom of the aircraft,
said structure for strengthening the C-shaped tracks extending outwardly around the tracks as a part of the aircraft frame structure.

* * * * *